United States Patent
Konuki (10) Patent No.: US 9,713,985 B2
(45) Date of Patent: Jul. 25, 2017

(54) VEHICLE REARVIEW MIRROR SYSTEM, AND VEHICLE PROVIDED WITH SAID VEHICLE REARVIEW MIRROR SYSTEM

(71) Applicant: ICHIKOH INDUSTRIES, LTD., Isehara-shi, Kanagawa-ken (JP)

(72) Inventor: Isao Konuki, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 159 days.

(21) Appl. No.: 14/374,678

(22) PCT Filed: May 22, 2013

(86) PCT No.: PCT/JP2013/064180
§ 371 (c)(1),
(2) Date: Jul. 25, 2014

(87) PCT Pub. No.: WO2013/176166
PCT Pub. Date: Nov. 28, 2013

(65) Prior Publication Data
US 2015/0043083 A1   Feb. 12, 2015

(30) Foreign Application Priority Data

May 23, 2012  (JP) .................................. 2012-117458

(51) Int. Cl.
*B60R 1/12*  (2006.01)
*B60R 1/02*  (2006.01)
(Continued)

(52) U.S. Cl.
CPC .................. *B60R 1/12* (2013.01); *B60R 1/00* (2013.01); *B60R 1/02* (2013.01); *B60R 1/04* (2013.01);
(Continued)

(58) Field of Classification Search
CPC .. B60R 1/02; B60R 1/12; B60R 1/008; B60R 2001/1215
(Continued)

(56) References Cited

U.S. PATENT DOCUMENTS 4,443,057 A * 4/1984 Bauer ..................... B60R 1/087
359/877
6,690,268 B2 * 2/2004 Schofield ................ B60C 23/00
359/838
(Continued)

FOREIGN PATENT DOCUMENTS

CN         103874605 A    6/2014
EP         2 789 505 A1   10/2014
(Continued)

*Primary Examiner* — Zachary Wilkes (74) *Attorney, Agent, or Firm* — Foley & Lardner LLP (57) ABSTRACT

A vehicle rearview mirror system is described. A display device constructs an image by an image signal having been output from an image receiving unit of a vehicle-mounted camera and then causes a display screen to display the constructed image. A vehicle mirror main body incorporates the display device. A posture of the vehicle mirror main body is altered between a posture when a driver watches a vehicle rear side appearing in a half mirror and a posture when the driver watches an image which is displayed on the display screen. An operating lever member is employed to alter the posture of the vehicle mirror main body. A power supply switch switches on or off the display device in conjunction with operation of the operating lever member.

6 Claims, 9 Drawing Sheets

(51) Int. Cl.
*B60R 1/04* (2006.01)
*B60R 1/00* (2006.01)
*H04N 7/18* (2006.01)

(52) U.S. Cl.
CPC ... *B60R 2001/1253* (2013.01); *B60R 2300/70* (2013.01); *B60R 2300/8026* (2013.01); *H04N 7/18* (2013.01)

(58) Field of Classification Search
USPC .................................................. 359/843, 844
See application file for complete search history.

(56) References Cited

U.S. PATENT DOCUMENTS

| 8,885,240 B2 * | 11/2014 | Roth | B60R 1/02 |
| | | | 359/267 |
| 2004/0027695 A1 * | 2/2004 | Lin | B60R 1/083 |
| | | | 359/839 |
| 2015/0277203 A1 * | 10/2015 | VanderPloeg | B60R 1/088 |
| | | | 349/113 |

FOREIGN PATENT DOCUMENTS

| JP | 61-080125 A | 4/1986 |
| JP | 03-028947 U | 3/1991 |
| JP | 07-021450 U | 4/1995 |
| JP | 2008-280037 A | 11/2008 |
| JP | 2009-226979 A | 10/2009 |

* cited by examiner

VEHICLE REARVIEW MIRROR SYSTEM, AND VEHICLE PROVIDED WITH SAID VEHICLE REARVIEW MIRROR SYSTEM

TECHNICAL FIELD

The present invention relates to a vehicle rearview mirror system and a vehicle provided with the vehicle rearview mirror system.

BACKGROUND ART

Conventionally and up to now, in a vehicle rearview mirror system, it has been known that there is provided a construction in which a liquid crystal display device is provided inside of a vehicle mirror main body, an image acquired by a vehicle-mounted camera is displayed on the liquid crystal display device, and the displayed image can be visually recognized by a driver through a half mirror provided on a front face of the vehicle mirror main body. (Refer to Patent Literature 1, for example).

CITATION LIST

Patent Literature

[Patent Literature 1] Japanese Utility Model Application Publication No. 03-28947

SUMMARY OF THE INVENTION

Problems to be Solved by the Invention

Incidentally, in this vehicle rearview mirror system, there is proposed a construction in which a vehicle mirror main body is inclined between a posture of the vehicle mirror main body when a driver watches a vehicle rear side appearing in a half mirror and a posture of the vehicle mirror main body when the driver watches an image which is displayed on a liquid crystal display screen of a liquid crystal display device.

In this case, it is desirable to employ a construction in which a power source of the liquid crystal display device and a power source of a vehicle-mounted camera are switched on or off according to an inclined posture of the vehicle mirror main body. In addition, at night time or the like, if intense illumination light of a following vehicle is incident to the vehicle-mounted camera, smearing occurs, or alternatively, in a case where an image is displayed on the liquid crystal display screen of the liquid crystal display device, it is difficult for a driver to watch the displayed image.

Under such an acquisition condition in which it is difficult to recognize the image, it is desirable to employ a construction in which the power source of the liquid crystal display device is automatically switched off and the vehicle mirror main body is altered to a posture at which the vehicle rear side appearing in the half mirror can be seen.

The present invention has been made in view of the circumstance mentioned above, and it is an object of the present invention to provide: a vehicle rearview mirror system having a construction in which a display device is switched on or off in conjunction with alteration of a vehicle mirror main body when there is employed a construction in which the vehicle mirror main body is inclined between a posture of the vehicle mirror main body when a driver watches a vehicle rear side appearing in a half mirror and a posture of the vehicle mirror main body when the driver watches an image which is displayed on a display screen of the display device; and a vehicle having the vehicle rearview mirror system.

Means for Solving the Problem

A vehicle rearview mirror system of the present invention is provided with: a display device in which is provided a signal processing unit to construct an image by an image signal outputted from an image receiving unit of a vehicle-mounted camera and then cause displays to a display screen the constructed image; a vehicle mirror main body in which is incorporated; an operating lever member; and a power supply switch.

In so far as the vehicle mirror main body is concerned, a posture thereof is altered between a posture when a driver watches a vehicle rear side appearing in a half mirror and a posture when the driver watches an image which is displayed on a display screen of a display device. The operating lever member is employed to alter the posture of the vehicle mirror main body, and the power supply switch switches on or off the display device in conjunction with operation of the operating lever member.

Effect of the Invention

According to the present invention, it is possible to switch on or off a display device in conjunction with alteration the posture of a vehicle mirror main body when there is employed a construction in which incline of the vehicle mirror main body between a posture of the vehicle mirror main body when a driver watches a vehicle rear side reflected in a half mirror and a posture of the vehicle mirror main body when the driver watches an image displayed on a display screen of the display device

BRIEF DESCRIPTION OF THE DRAWINGS

FIG. 6 is an illustrative view conceptually showing conversion of the aspect ratio, wherein FIG. 6 (*a*) is an illustrative view in a case where an attempt is made to carry out conversion of an aspect ratio while clipping an upper image portion which is unrequired to be seen at the time of driving from the image that is constructed by the image signal having been output from the image receiving unit of the vehicle-mounted camera, FIG. 6 (*b*) is an illustrative view in a case where an attempt is made to carry out conversion of an aspect ratio while clipping a lower image portion which is unrequired to be seen at the time of driving from the image that is constructed by the image signal having been output from the image receiving unit of the vehicle-mounted camera, and FIG. 6 (*c*) is an illustrative view in a case where an attempt is made to carry out conversion of an aspect ratio while clipping an upper unit and a lower image portions which are unrequired to be seen at the time of driving from the image that is constructed by the image signal having been output from the image receiving unit of the vehicle-mounted camera.

BEST MODES FOR CARRYING OUT THE INVENTION

Embodiments

Figure 1:
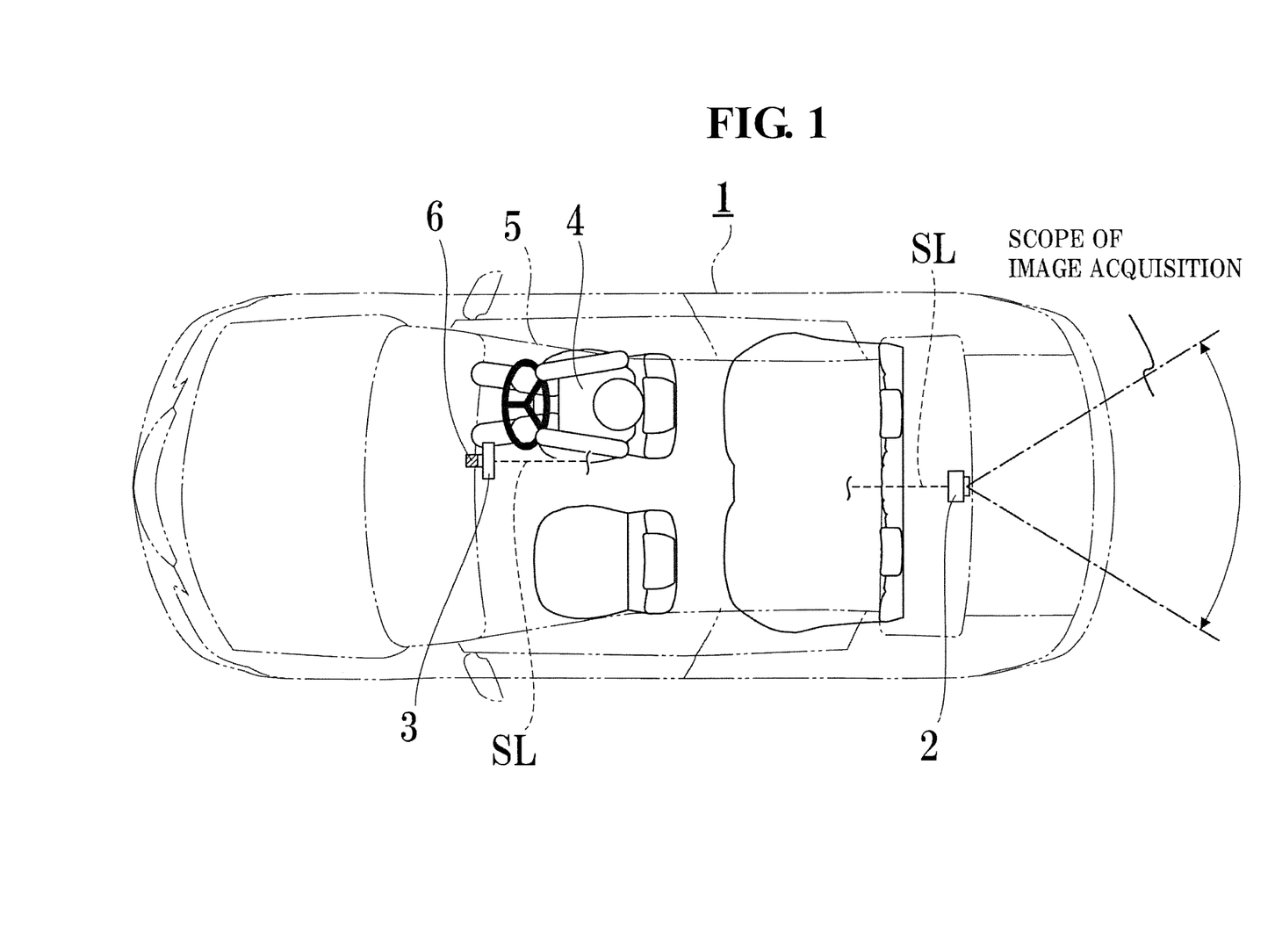
FIG. 1 is a plan view when a vehicle provided with a vehicle rearview mirror system according to the present invention is seen from a top side.

Embodiments of a vehicle rearview mirror system according to the present invention will be described with reference to the drawings. FIG. 1 is a plan view when a vehicle provided with a vehicle rearview mirror system according to the present invention is seen from a top side. In FIG. 1, reference numeral 1 designates a vehicle, reference numeral 2 designates a vehicle-mounted camera, reference numeral 3 designates a vehicle mirror main body, and reference numeral 4 designates a driver.

A vehicle-mounted camera 2 is installed in a vehicle 1 so as to be able to acquire an object on a vehicle rear side. A vehicle mirror main body 3 is supported via a support arm member that will be described later, front of a driver 4 and at an appropriate site of a ceiling 5.

Figure 2:
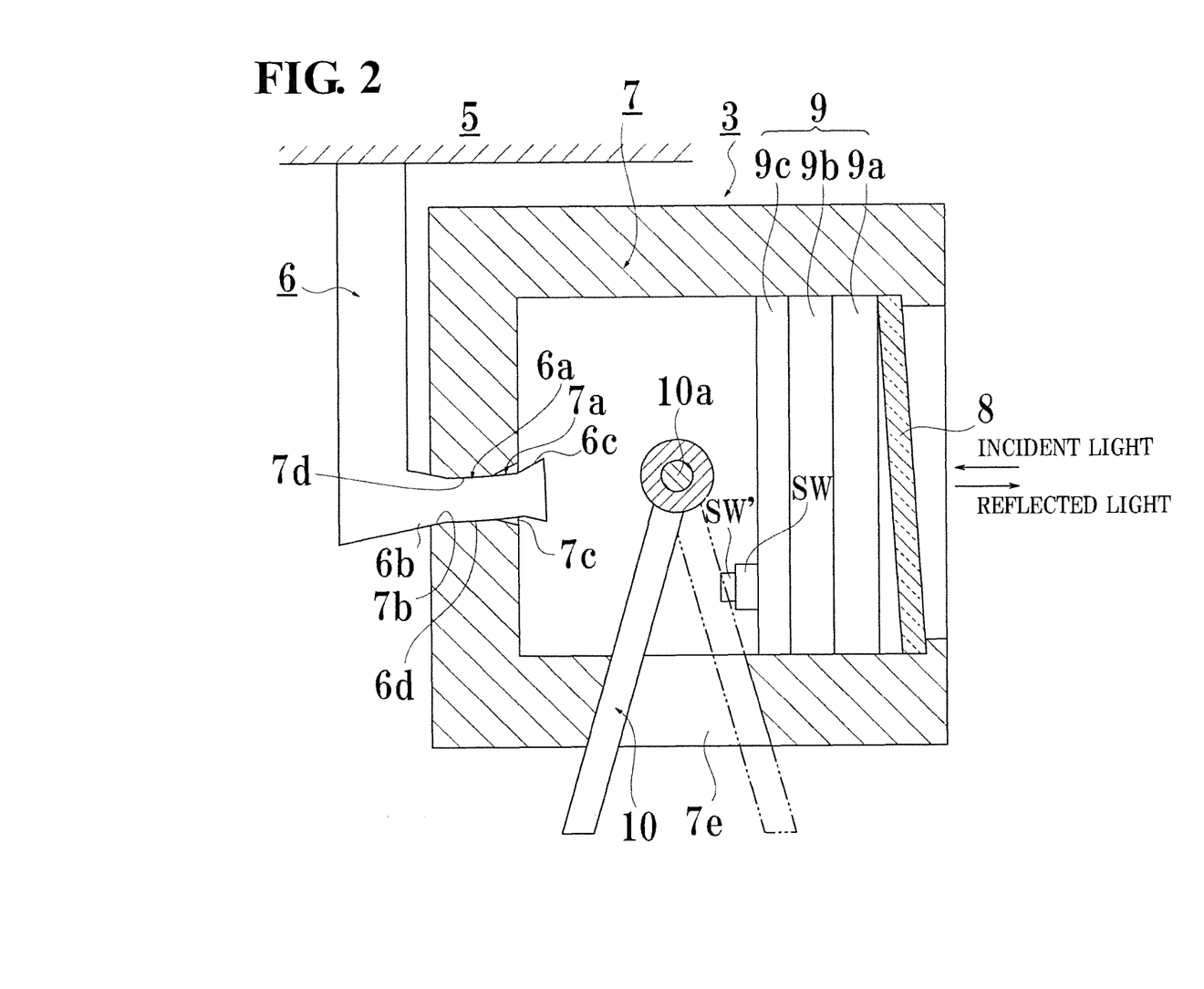
FIG. 2 is a schematic view showing a schematic construction of a vehicle mirror main body shown in FIG. 1, and is also a view showing a posture of the vehicle mirror main body when a driver watches a vehicle rear side appearing in a half mirror.
Figure 3:
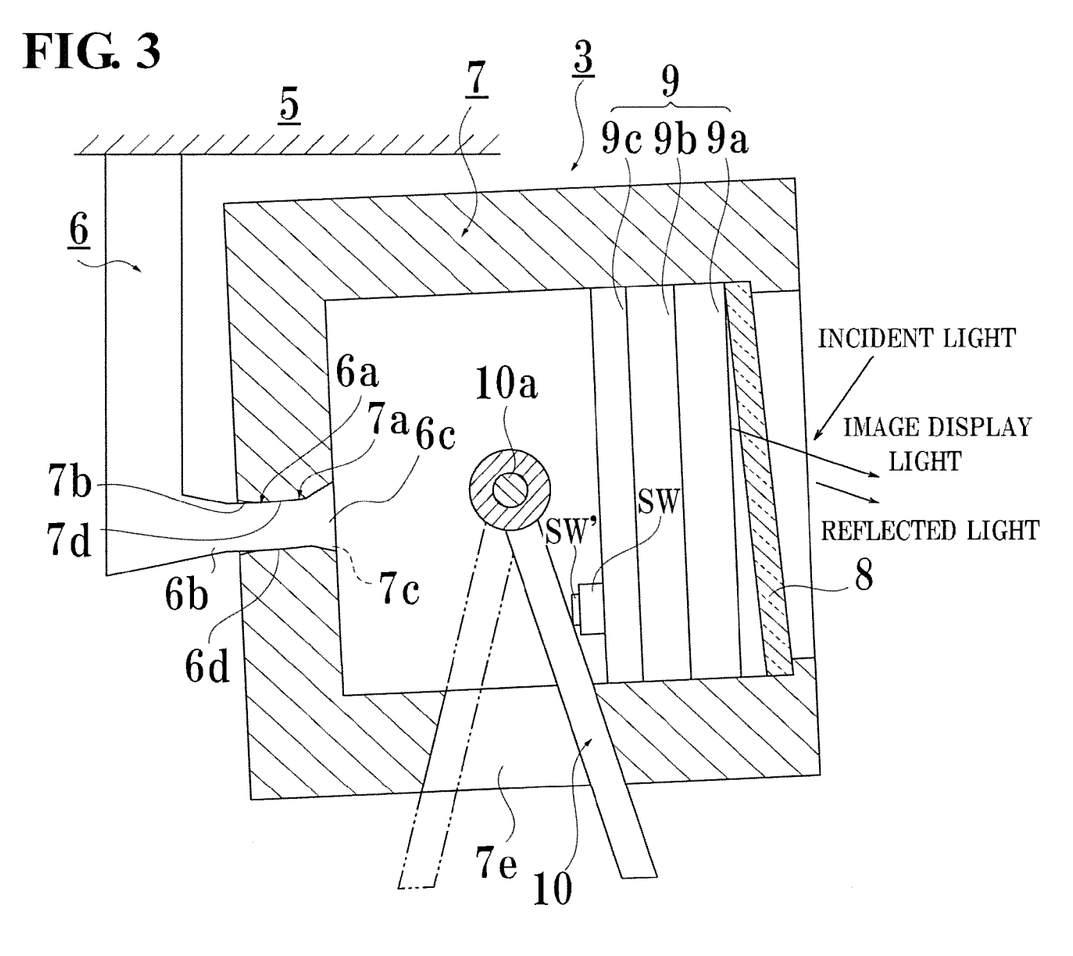
FIG. 3 is a schematic view showing a schematic construction of a vehicle mirror main body shown in FIG. 1, and is also a view showing a posture of the vehicle mirror main body when a driver watches an image which is displayed on a liquid crystal display screen of a liquid crystal display device.

(Construction of Vehicle Mirror Main Body 3)
On the ceiling 5, as shown in FIGS. 2 and 3, a support arm member 6 extending toward a vertical lower side is provided. The support arm member 6 has a support unit 6*a* extending in a horizontal direction.

At a tip end part and a rear end part of this support unit 6*a*, a tapered stopper units 6*b*, 6*c* are formed. Between a stopper unit 6*b* and a stopper unit 6*c* of the support unit 6*a*, a curved unit 6*d* having a predetermined curvature is formed.

The vehicle mirror main body 3 has a casing 7 extending in a transverse direction (a horizontal direction). On a rear wall of the casing 7, engagement holes 7*a* are formed. The engagement holes 7*a* are made of: engagement holes 7*b*, 7*c* corresponding to a shape of the stopper unit 6*b* of the support unit 6*a*; and an engagement hole 7*d* having a curvature corresponding to the curved unit 5*d*. The support unit 6*a* and the engagement hole 7*a* are engaged with each other at an appropriate frictional force, and this frictional force is defined to an extent such that a posture of the vehicle mirror main body 3 does not alter.

It is to be noted that FIGS. 2 and 3 schematically show support for the support arm member 6 of the vehicle mirror main body 3, a support structure thereof is not limitative thereto, and a contrivance can be appropriately made for assembling with the support unit 6*a* of the vehicle mirror main body 3.

On a front wall of the casing 7, an opening is formed, and in the opening, a flat and rectangular half mirror 8 is provided. In the vicinity of the half mirror 8, a liquid crystal display device 9 as a display device is provided. The liquid crystal display device 9 is provided as one unit, reference numeral 9*a* designates a liquid crystal display screen as a display screen, reference numeral 9*b* designates a backlight illumination unit, and reference numeral 9*c* designates an electric circuit board portion. A circuit construction of the liquid crystal display device 9 will be described later.

An aspect ratio between a width in a transverse direction and a width in a longitudinal direction of the casing 7 one-to-one corresponds to an aspect ratio of a liquid crystal display screen 9*a* of a liquid crystal display device 9, and this aspect ratio also one-to-one corresponds to an aspect ratio between a width in a transverse direction and a width in a longitudinal direction of the half mirror 8.

The half mirror 8 is capable of transmitting image display light from the liquid crystal display screen 9*a* of the liquid crystal display device 9, and is employed to cause the driver 4 to visually recognize a vehicle rear side. Inside of the casing 7, an operating lever member 10 is provided.

The operating lever member 10 is turnable in a forward and backward direction about a turning shaft 10*a*. On a lower wall of the casing 7, an elongated hole 7*e* extending in a forward and backward direction is formed. The operating lever member 10 extends toward a lower side, and a lower end part thereof is exposed to the outside of the casing 7 through the elongated hole 7*e*.

The operating lever member 10 is brought into sliding contact with a circumferential wall of the elongated hole 7*e* at an appropriate frictional force, and in the operating lever member 10, a posture thereof is retained at a turning operation position thereof by the frictional force exerted by the circumferential wall of the elongated hole 7*e*.

FIG. 2 shows an inclined posture of the vehicle mirror main body 3 when the driver 4 watches a vehicle rear view reflected in the half mirror 8, and FIG. 3 shows an inclined posture of the vehicle mirror main body 3 when the driver 4 watches an image displayed on the liquid crystal display screen 9*a* through the half mirror 8. At this time, the ceiling 5 appears (reflected) in the half mirror 8.

When the driver 4 handles the operating lever member 10 and then operates the operating lever member 10 in a direction approaching the driver 4, the casing 7 is moved along the curved unit 6d of the support unit 6a. And by this operation, the vehicle mirror main body 3 is inclined from a posture shown in FIG. 2 when the driver 4 watches a vehicle rear side reflected in the half mirror 8 to the posture shown in FIG. 3 when the driver 4 watches the image displayed on the liquid crystal display screen 9a through the half mirror 8, and in this state, the inclined posture of the vehicle mirror main body 3 is retained.

The half mirror 8 is disposed in the casing 7 at a slightly inclined angle with respect to the liquid crystal display screen 9a, whereby, when the vehicle mirror main body 3 is retained at the inclined posture shown in FIG. 3, reflected light (disturbance light), which is reflected by the half mirror 8, is less oriented to the driver 4.

Therefore, in a case where an attempt is made to check a rear side by employing the liquid crystal display device 9, as shown in FIG. 3, the vehicle mirror main body 3 is retained at the inclined posture so that the ceiling 5 appears, whereby it is possible to avoid incidence of bright disturbance light from the rear side to the eyes of the driver 4, and it is also possible to improve visual recognition of the image that is displayed on the display screen 9a of the liquid crystal display device 9.

Figure 4:
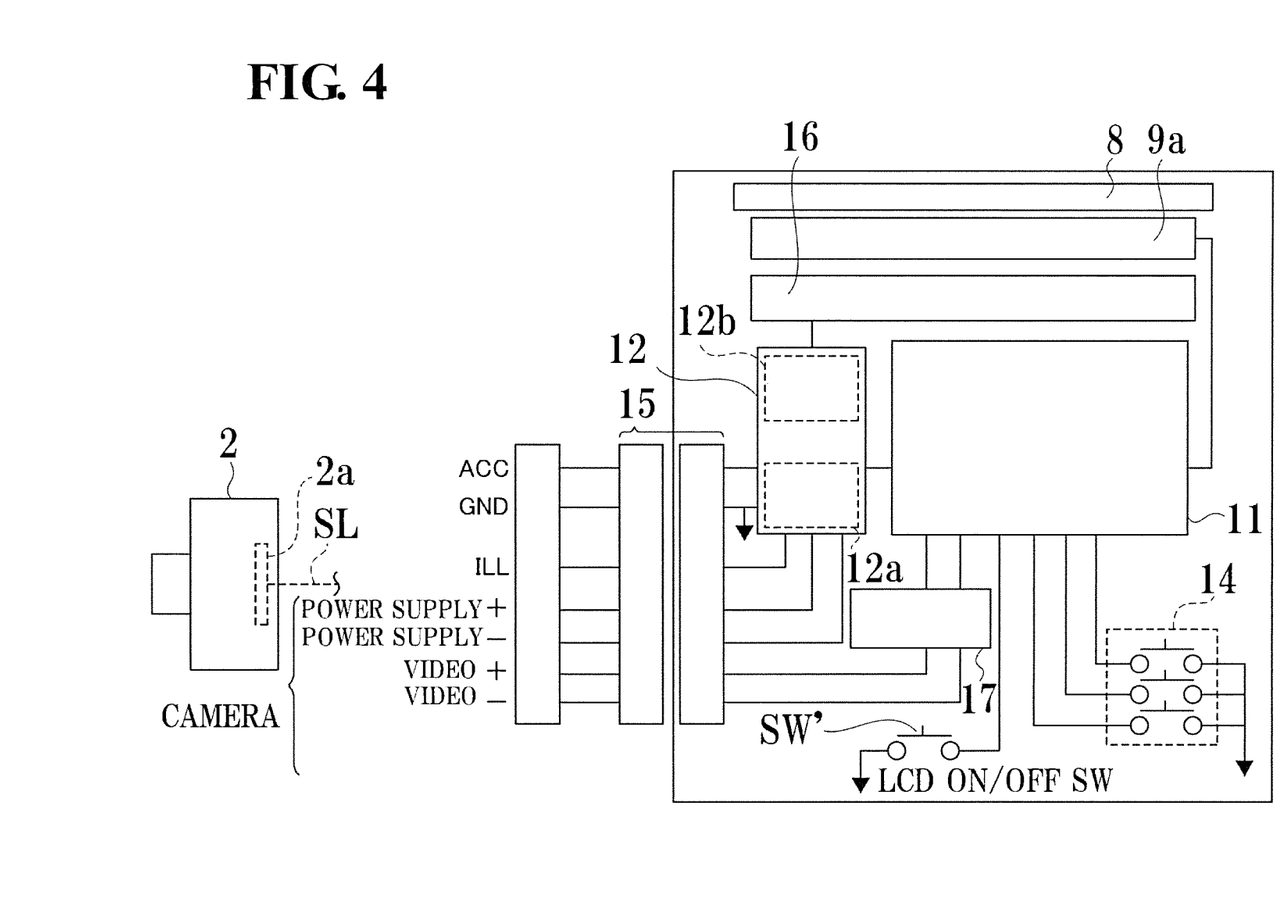
FIG. 4 is a block diagram showing a circuit construction of a liquid crystal display device according to a first embodiment of the vehicle rearview mirror system according to the present invention.

The liquid crystal display device 9, as shown in FIG. 4, is substantially composed of: a signal processing unit 11 to process an image signal having been output from the image receiving unit 2a of the vehicle-mounted camera 2 and then cause the liquid crystal display screen 9a to display a resultant image; a power supply unit 12; an image adjustment menu switch 14; a connector portion 15; a backlight illumination unit (an LED illumination unit) 16; and an LCD ON/OFF switch SW. These electric circuit constituent elements are arranged on an electric circuit board portion 9c. It is to be noted that an image acquisition element such as publicly known CCD is employed for the image receiving unit 2a.

At an input side of the connector portion 15, there are provided: an alternating current power supply terminal ACC; a ground terminal GND; a ILL terminal; a positive terminal for power supply; a negative terminal for power supply; a positive input terminal for image acquisition signal; and a negative input terminal for image acquisition signal.

The ILL terminal, the power supply positive terminal, and the power supply negative terminal are electrically connected to the vehicle-mounted camera 2 via a power supply feeding line (not shown), and the positive input terminal for image acquisition signal and the negative input terminal for image acquisition signal are electrically connected to the image receiving unit 2a of the vehicle-mounted camera 2 via a signal line SL. It is to be noted that the power supply unit 12 is composed of a camera power supply unit 12a and a backlight power supply unit 12b.

The LCD ON/OFF switch SW, as shown in FIGS. 2 and 3, is provided to be seen in a turning region of the operating lever member 10. The LCD ON/OFF switch SW has an actuator unit SW', and the actuator unit SW' is switched on or off in conjunction with operation of the operating lever switch 10.

When the driver 4 watches a vehicle rear side reflected in the half mirror 8, as shown in FIG. 2, the operating lever member 10 is spaced from the actuator unit SW', and when the driver 4 watches an image displayed on the liquid crystal display screen 9a, the operating lever member 10 is abutted against the actuator unit SW', as shown in FIG. 3.

The LCD ON/OFF switch SW, here, as shown in FIGS. 2 and 3, is provided on a lower wall of the casing 7. When an actuator unit SW' of the LCD ON/OFF switch SW is switched on, a voltage is applied from the alternating current power supply terminal ACC to the power supply unit 12, and from the power supply unit 12, power is supplied to the vehicle-mounted camera 2 and the backlight illumination unit 16, whereby the backlight illumination unit 16 is lit, and the vehicle-mounted camera 2 is switched on.

When the vehicle-mounted camera 2 is switched on, an image signal from the image receiving unit 2a is input to an image signal clipping unit 17 via the connector portion 15. Functions of the image signal clipping unit 17 will be described later. Although the image signal having been output from the image receiving unit 2a is an analog signal, this analog signal is converted to a digital signal by a publicly known AD/conversion circuit (not shown) in the vehicle-mounted camera 2, and the converted digital signal is output to the image signal clipping unit 17. The image signal clipping unit 17 outputs an image signal to the signal processing unit 11 and the signal processing unit 11 applies predetermined processing to an input image signal and then outputs the resultant image to the liquid crystal display screen 9a.

In so far as the image of the liquid crystal display screen 9a is concerned, the intensity, hue, and color gradation or the like can be adjusted by the image adjustment menu switch 14. Constructions of the signal processing unit 11, the power supply unit 12, the image adjustment menu switch 14, the connector portion 15, the backlight illumination unit 16, and the LCD ON/OFF switch SW can be employed as publicly known ones.

The image signal clipping unit 17 serves to clip an image signal corresponding to an image portion which is unrequired for driving by the driver 4 and then output to the signal processing unit 11 the remaining image signal from an image which is constructed by an image signal having been output from the image receiving unit 2a of the vehicle-mounted camera 2, Here, the image signal clipping unit 17 is composed of an image signal conversion block portion to which the image signal having been output from the image receiving unit 2a of the vehicle-mounted camera 2 is input, and which converts an aspect ratio in a longitudinal direction and a transverse direction to an aspect ratio of the liquid crystal display screen 9a and then outputs the converted aspect ratio to the signal processing unit 11 from the image that is constructed by the image signal having been output from the image receiving units 2a.

The signal processing unit 11 constructs an image of an aspect ratio one-to-one corresponding to an aspect ratio of the liquid crystal display screen 9a by a remaining image signal excluding the image signal that is clipped by the image signal clipping unit 17.

Figure 5:
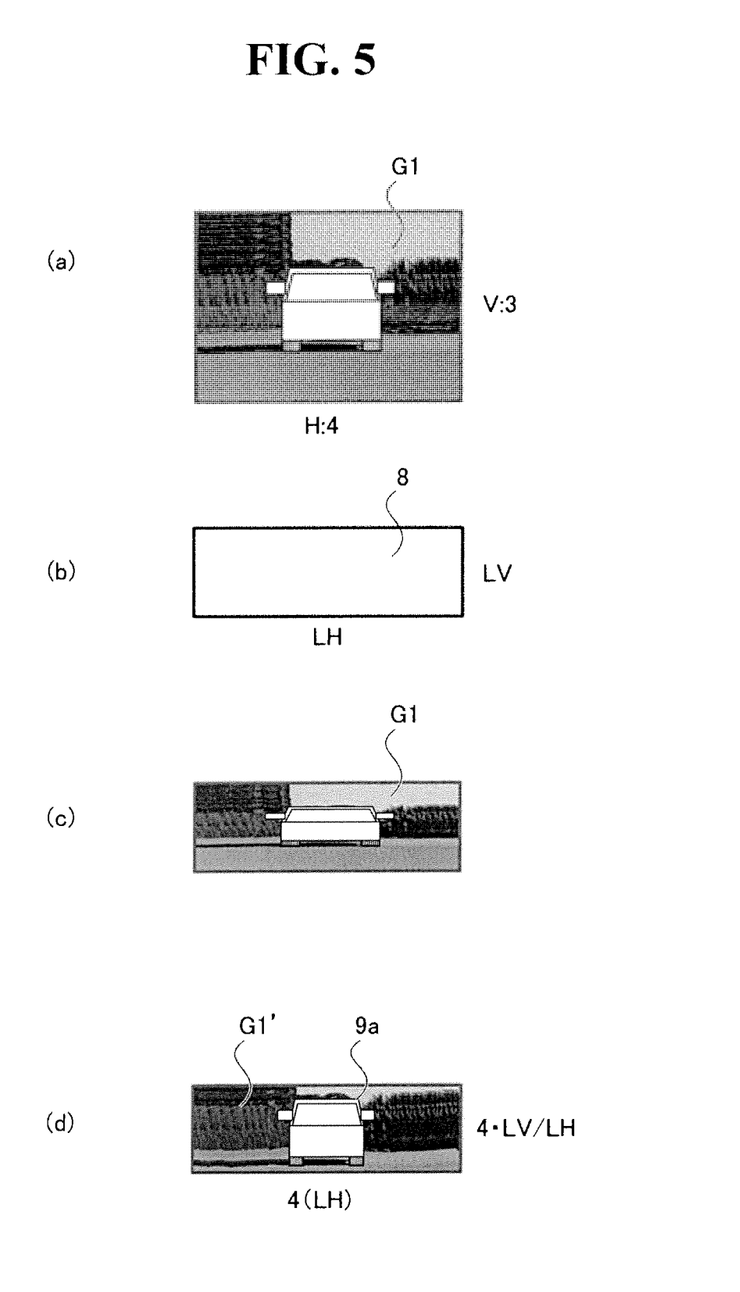
FIG. 5 is an illustrative view for illustrating a failure exerted by a difference between an aspect ratio of an image which is constructed by an image signal having been output from an image receiving unit shown in FIG. 4 and an aspect ratio of the liquid crystal display screen shown in FIGS. 2 and 3, wherein FIG. 5 (*a*) is an illustrative view illustrating an aspect ratio of the image that is constructed by the image signal having been output from the image receiving unit, FIG. 5 (*b*) is an illustrative view of the aspect ratio of the liquid crystal display screen shown in FIGS. 2 and 3, FIG. 5 (*c*) is an illustrative view illustrating a failure when the image signal having been output from the image receiving unit is employed as it is, and then, an image is displayed on the liquid crystal display screen, and FIG. 5 (*d*) is an illustrative view in a case of converting the aspect ratio of the image that is constructed by the image signal having been output from the image receiving unit and displaying an image of the converted aspect ratio on the liquid crystal display screen.

An aspect ratio in a width in a longitudinal direction and a width in a transverse direction of an image G1 which is constructed by the image signal having been output from the image receiving unit 2a of the vehicle-mounted camera 2 is transverse 4: longitudinal 3, as shown in FIG. 5 (a), for example. In contrary to this, the rectangular half mirror 8 is longer in transverse direction than in longitudinal direction, and as shown in FIG. 5 (b), an aspect ratio between the width in the transverse direction and the width in the longitudinal direction is LH:LV.

Therefore, assuming that the image signal having been output from the image receiving unit 2a of the vehicle-mounted camera 2 is input to the signal processing unit 11 as it is, in place of providing the image signal clipping unit 17 and then the input signal is displayed on the liquid crystal display screen 9a, as shown in FIG. 5 (c), the image G1 is produced as an image having been collapsed and distorted in a longitudinal direction.

On contrary to this, assuming that: the image signal clipping unit 17 is composed of an image signal conversion unit; the aspect ratio of the image G1 is converted to the aspect ratio of the liquid crystal display screen 9a, that is, 4:4 (LV/LH) by the image signal conversion unit; and then a resultant image of the converted aspect ratio is clipped, as shown in FIG. 5 (d), it is possible to prevent the image G1 (refer to FIG. 5 (c) from appearing as the image G1' having been collapsed and distorted in the longitudinal direction.

Figure 6:
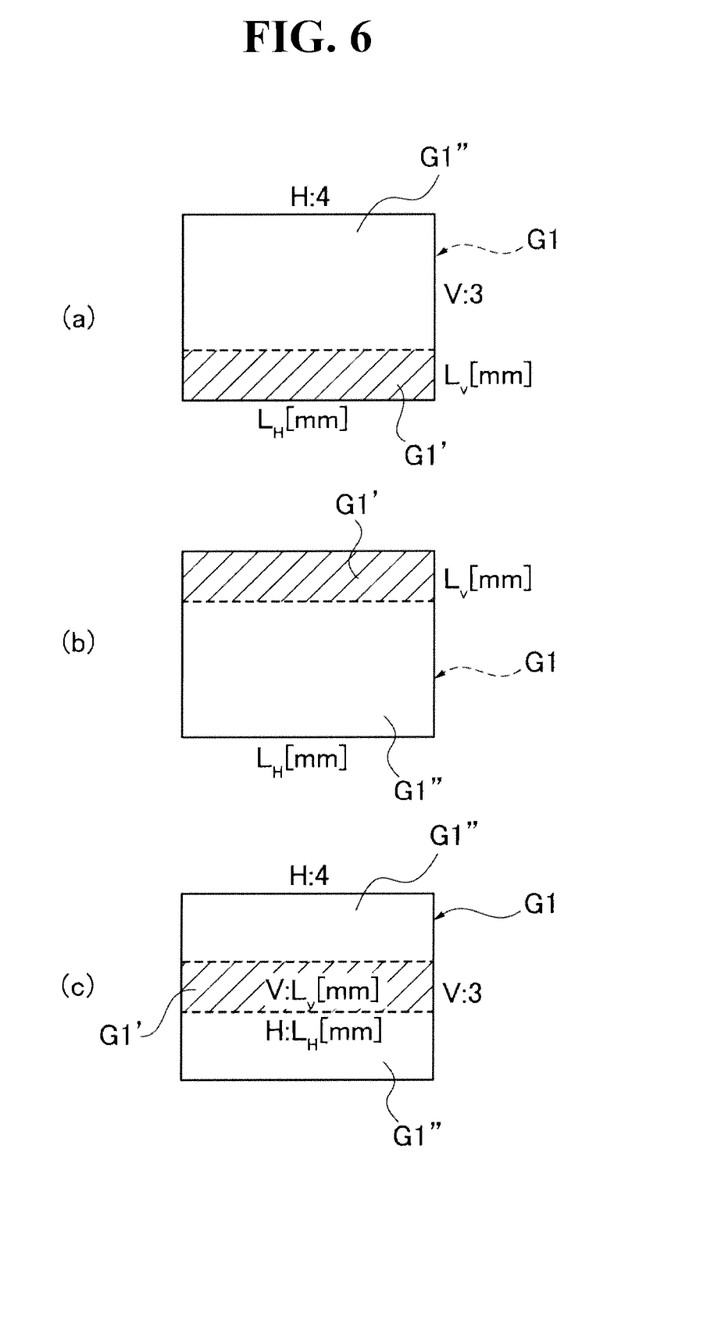

FIG. 6 shows an example of clipping the image G1 that is constructed by the image signal having been output from the image receiving unit 2a, wherein FIG. 6 (a) shows a schematic view of a construction of clipping an image portion G1" which is unrequired for driving by the driver 4 from the image G1 and then causing the liquid crystal display screen to display an remaining image G1'.

Also, FIG. 6 (b) is a view of a construction of clipping a lower image portion G1" which is unrequired for driving by the driver 4 from the image G1 that is constructed by the image signal having been output from the image receiving unit 2a and then causing the liquid crystal display screen 9a to display a remaining image G1', and FIG. 6 (c) is a view of a construction of clipping upper and lower image portions G1", which are unrequired for driving by the driver 4 from the image G1 that is constructed by the image signal having been output from the image receiving unit 2a and then causing the liquid crystal display screen 9a to display the remaining image G1'.

Of the image G1 that is acquired by the vehicle-mounted camera 2, a sky substantially appears at the upper image portions of the image G1, and even if these image portions are not displayed on the liquid crystal display screen 9a, no problem will arise in driving by the vehicle 2.

Of the image G1 that is acquired by the vehicle-mounted camera 2, a road or the like which is substantially distant from the vehicle 2 appears at the lower image portions of the image G1, and even if these image portions are not displayed on the liquid crystal display screen 9a, no problem will arise in driving by the vehicle 2.

As shown in FIG. 6 (c), as long as there is employed a construction of clipping the upper and lower image portions which are unrequired for driving by the driver 4 from the image G1 that is acquired by the vehicle-mounted camera 2, converting an aspect ratio of the image that is acquired by the car-mounted camera 2 to an aspect ratio of the liquid crystal display screen 9a and then causing the liquid crystal display screen 9a to display the image G1' that is acquired by the vehicle-mounted camera 2, it is possible to avoid production of a vertically collapsed and distorted image while avoiding display of information which is unrequired for driving by the driver 4.

(Other Examples of Construction of Vehicle Mirror Main Body 3)

Figure 7:
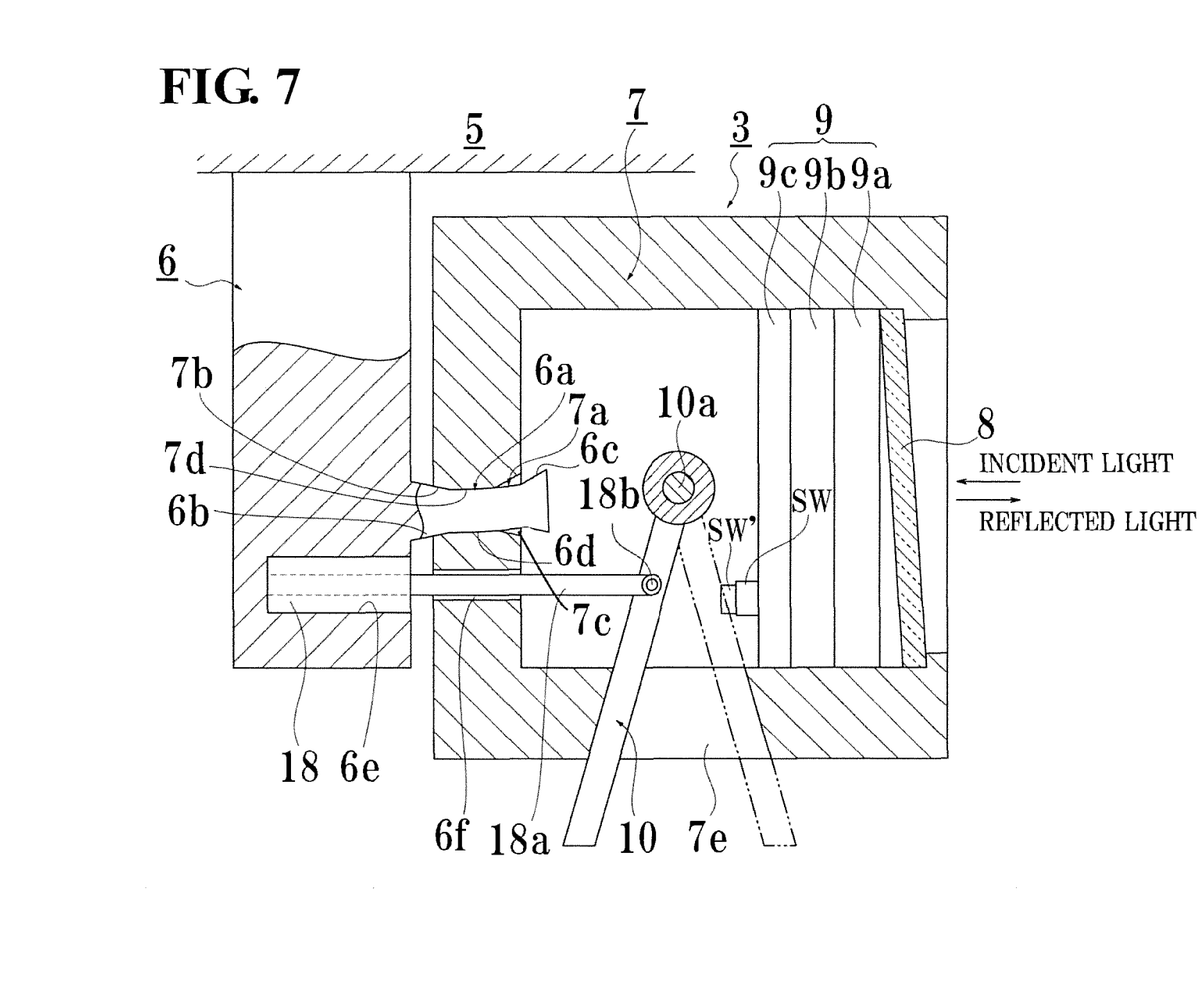
FIG. 7 is an illustrative view of a second embodiment of the vehicle rearview mirror system according to the present invention, and is also a view showing a posture of a vehicle mirror main body when a driver watches a vehicle rear side appearing in a half mirror.
Figure 8:
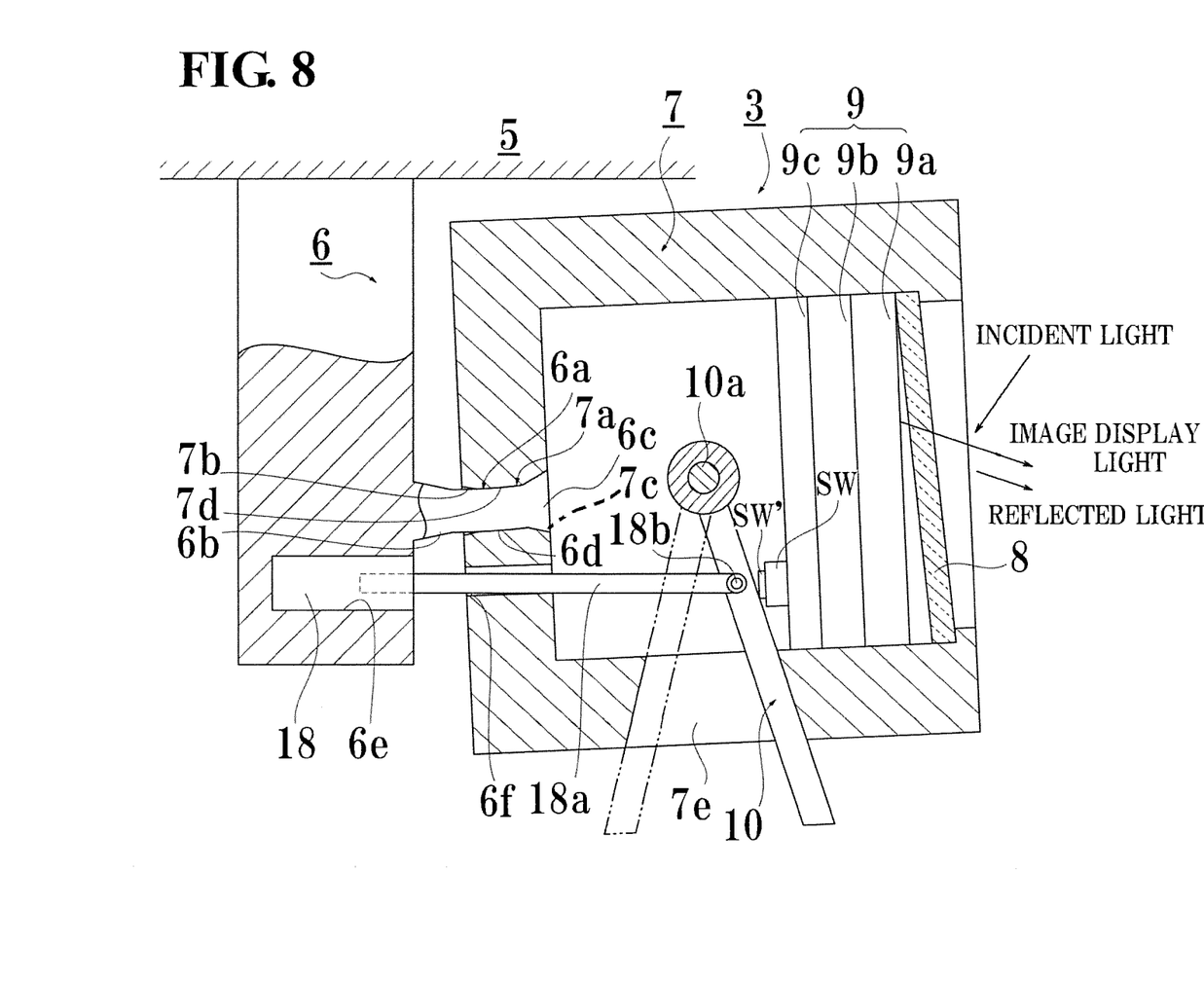
FIG. 8 is a view showing a posture of the vehicle mirror main body when a driver watches the image that is displayed on a liquid crystal display screen of a liquid crystal display device while the vehicle mirror main body shown in FIG. 7 is inclined.
Figure 9:
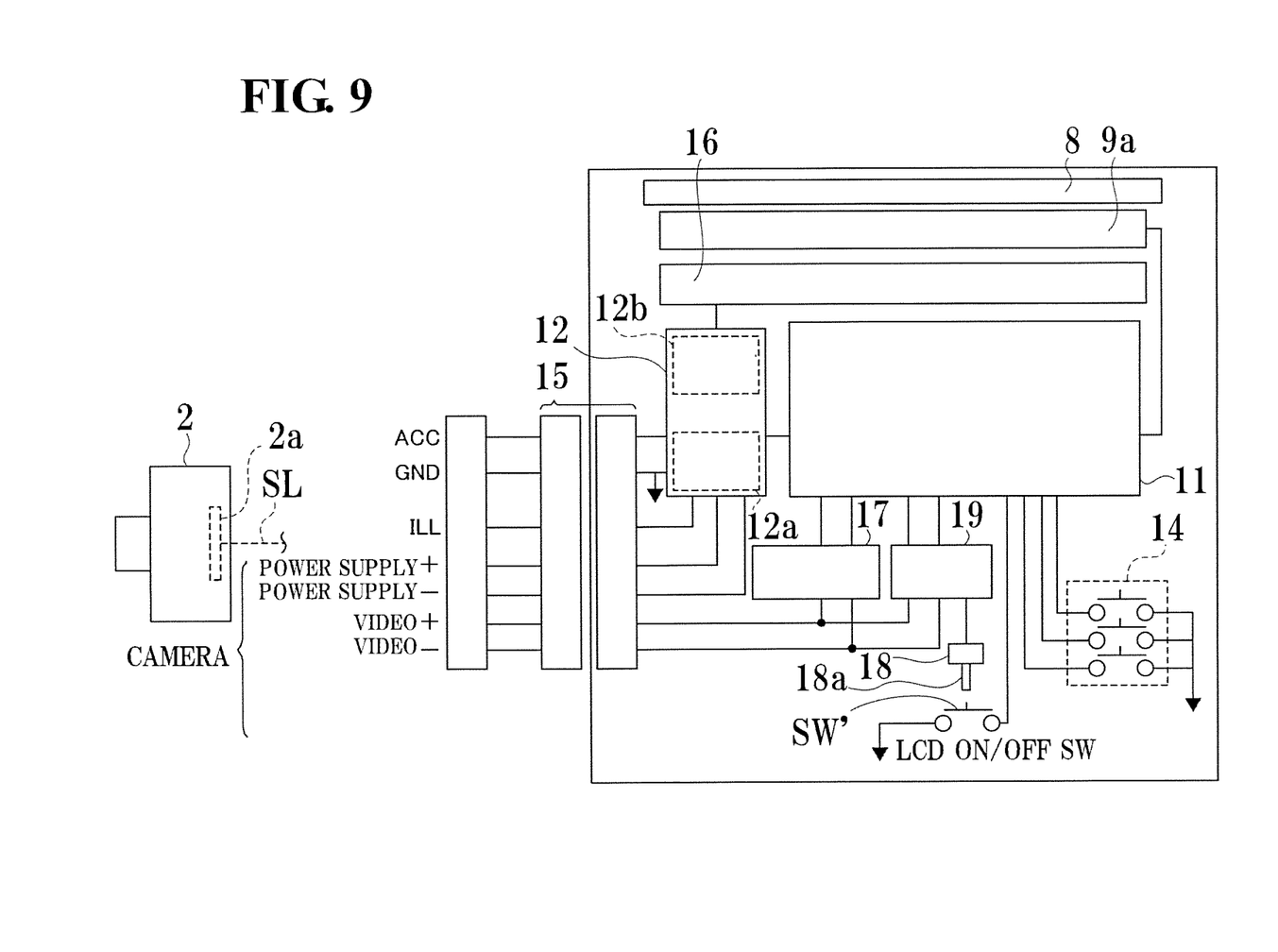
FIG. 9 is a block diagram showing a circuit construction of the liquid crystal display device according to the second embodiment, of the vehicle rearview mirror system according to the present invention.

FIGS. 7 to 9 are illustrative views of the second embodiment of the vehicle rearview mirror system according to the present invention, and at the support arm member 6 shown in FIGS. 7 and 8, a driving member arrangement portion 6e is provided.

At the driving member arrangement portion 6e, a plunger device 18 as a driving member to drive the operating lever member 10 is provided. The plunger device 18 has a rod 18a to retain two positions, that is, an advancing position and a retracting position.

A through hole 6f is formed on a rear wall of the casing 7, and a rod 18a penetrates the through hole 6f and then extends to the inside of the casing 7. A tip end part in the direction in which the rod 18a extends is coupled with the operating lever member 10 via a coupling shaft 18b.

When the rod 18a advances, the operating lever member 10 is turned in a direction approaching the driver 4, around the turning shaft 10a, and the operating lever member 10 abuts against the actuator unit SW', whereby the liquid crystal display 9 is switched on, and then, the vehicle-mounted camera 2 is switched on. Also, a lower end part of the operating lever member 10 abuts against one forward and backward directional circumferential wall of an elongated hole 7e, whereby the casing 7 is lifted, and the lifted posture is altered from the posture shown in FIG. 7 to the posture shown in FIG. 8.

When the rod 18a retracts, the operating lever member 20 is turned in a direction spaced from the driver 4, around the turning shaft 10a, and the operating lever member 10 is spaced from the actuator unit SW', whereby the liquid crystal display device 9 is switched off, and then, the vehicle-mounted camera 2 is switched off. Also, the lower end part of the operating lever member 10 abuts against the other forward and backward directional circumferential wall of the elongated hole 7e, whereby the casing 7 is lowered and the lowered posture is altered from the posture shown in FIG. 7 to the posture shown in FIG. 8.

In the second embodiment, the liquid crystal display device 9 has a detection circuit portion 19 to detect luminance by an image signal and then compare the detected luminance with a threshold value. The detection circuit portion 19 here determines whether or not the detected luminance is a first threshold value or less, and determines whether or not it is a second threshold value or more which is different from the first threshold value.

Here, the first threshold value is an luminance value which is defined assuming a state to an extent such that it is determined to be a dark state even if an acquired image is displayed on the liquid crystal display screen 9a, and the second threshold value is a luminance value which is defined assuming a state to an extent such that an object targeted to be acquired is too dizzy to determine in a case where an acquired image is displayed on the liquid crystal display screen 9a.

The plunger device 18 drives the operating lever member 10 so that the posture of the vehicle mirror main body 3 is altered from the posture when the driver 4 watches the image that is displayed on the liquid crystal display screen 9a of the liquid crystal display device 9 to the posture when the diver 4 watches the vehicle rear side reflected in the half mirror 8 when the luminance that is detected by the detection circuit portion 19 is the first threshold value or less, or alternatively, the second threshold value or more. In this manner, the power supply of the vehicle-mounted camera 2 and the power supply of the liquid crystal display device 9 can be switched off, and the posture of the vehicle mirror main body 3 can be altered.

Although in the foregoing embodiments, there was employed a construction in which the vehicle mirror main body 3 is inclined, and the power supply of the vehicle-mounted camera 2 and the power supply of the liquid crystal display device 9 are switched off by operating the operating lever member 10, there can be employed a construction which is provided with: a liquid crystal display device 9 in which is provided a signal processing unit 11 to construct an image by an image signal outputted from an image receiving unit of a vehicle-mounted camera and then cause displays to a liquid crystal display screen 9a the constructed image; a vehicle mirror main body 3 in which the liquid crystal display device 9 is incorporated, a posture of the vehicle mirror main body is altered between a posture when a driver 4 watches a vehicle rear side reflected in a half mirror 8 and a posture when the driver 4 watches an image displayed on the liquid crystal display screen 9a of the liquid crystal display device 9; and a power supply switch SW to switch on or off the liquid crystal display device 9, in which there is provided an electric driving means for altering the posture of the vehicle mirror main body 3 in conjunction with operation of the power supply switch SW, and inclination of the vehicle mirror main body 3 and switching on or off the power supply are carried out with "one-touch" operation.

The invention claimed is:

1. A vehicle rearview mirror system comprising:
a display device in which is provided a signal processing unit to construct an image by an image signal outputted from an image receiving unit of a vehicle-mounted camera and then cause a display screen to display the constructed image;
a vehicle mirror main body in which the display device is incorporated, a posture of the vehicle mirror main body is altered between a first posture when a driver watches a vehicle rear side reflected in a half mirror and a second posture when the driver watches an image displayed on the display screen of the display device;
an operating lever member to alter the posture of the vehicle mirror main body such that when the operating lever member is in a first position, the vehicle mirror main body is in the first posture, and when the operating lever member is in a second position, the vehicle mirror main body is in the second posture; and
a power supply switch to switch on or off the display device in conjunction with operation of the operating lever member,
wherein when the operating lever member is in the first position, the operating lever member contacts an actuator to cause the power supply switch to switch on the display device.

2. The vehicle rearview mirror system according to claim 1,
wherein the vehicle mirror main body has a casing which is supported to be inclinable on a ceiling via a support arm,
the operating lever member is turnably supported by the casing, and
on a circuit board of the display device, the power supply switch is arranged.

3. The vehicle rearview mirror system according to claim 2,
wherein the operating lever member is manually operable.

4. The vehicle rearview mirror system according to claim 2,
wherein a driving member to drive the operating lever member is provided in the support arm, and
the operating lever member is turned by driving of the driving member.

5. The vehicle rearview mirror system according to claim 4,
wherein the display device has a detection circuit portion to detect luminance by the image signal and then compare the detected luminance with a threshold value, and
wherein, when the luminance detected by the detection circuit portion is the threshold value or less, or alternatively, the threshold value or more, the driving member drives the operating lever member so that the posture of the vehicle mirror main body is altered from the second posture to the first posture.

6. A vehicle having the vehicle rearview mirror system according to claim 1 mounted thereon.

* * * * *